United States Patent [19]
Lee

[11] Patent Number: 5,627,708
[45] Date of Patent: May 6, 1997

[54] HIGH POWER FACTOR ELECTRONIC STABILIZER WITH PROTECTION CIRCUIT

[75] Inventor: Jin C. Lee, Kaohsiung, Taiwan

[73] Assignee: Yin Nan Enterprises Co, Ltd., Kaohsiung Shien, Taiwan

[21] Appl. No.: 419,085

[22] Filed: Apr. 10, 1995

[51] Int. Cl.$^6$ ............................................. H02H 7/00
[52] U.S. Cl. .................................... 361/18; 361/86
[58] Field of Search ........................ 361/18, 56, 86, 361/91, 100; 315/247, 248, 307, 310, DIG. 5, DIG. 7; 318/729

[56] References Cited

U.S. PATENT DOCUMENTS

| | | | |
|---|---|---|---|
| 4,994,717 | 2/1991 | Moon | 315/219 |
| 5,208,515 | 5/1993 | Lee | 315/225 |
| 5,410,221 | 4/1995 | Mattas et al. | 315/307 |

Primary Examiner—Howard L. Williams
Assistant Examiner—Ronald W. Leja

[57] ABSTRACT

A high power factor electronic stabilizer with projection circuit application comprising a high frequency filter between the input of a power source and a rectifying circuit, a feed-back power factor improving circuit between the rectifying circuit and an oscillating circuit for adjusting the angle of phase difference of the input current and voltage to the minimum to obtain the best power factor by taking a high frequency voltage from a lamp and feeding back to the output of the rectifying circuit and by switching a high frequency by means of the high frequency filter and the feed-back power factor improving circuit, and a protective circuit connected between the oscillating circuit and the feed-back power improving circuit for protecting the electronic stabilizer to elevate its quality and service life, turning off the transistors in case of the lamp getting out of order.

6 Claims, 11 Drawing Sheets

HIGH POWER FACTOR ELECTRONIC STABILIZER WITH PROTECTION CIRCUIT

BACKGROUND OF THE INVENTION

This invention concerns a high power factor electronic stabilizer with a protection circuit, and in particular one which does not use a conventional LC wave filter, is able to obtain more than a 0.98 power factor, has greatly reduced weight, eliminates the noise that ordinary conventional LC filters have, reduces waste of electricity, prevents breakdowns caused by lamp malfunctions, and has a higher service life and higher quality.

Figure 1:
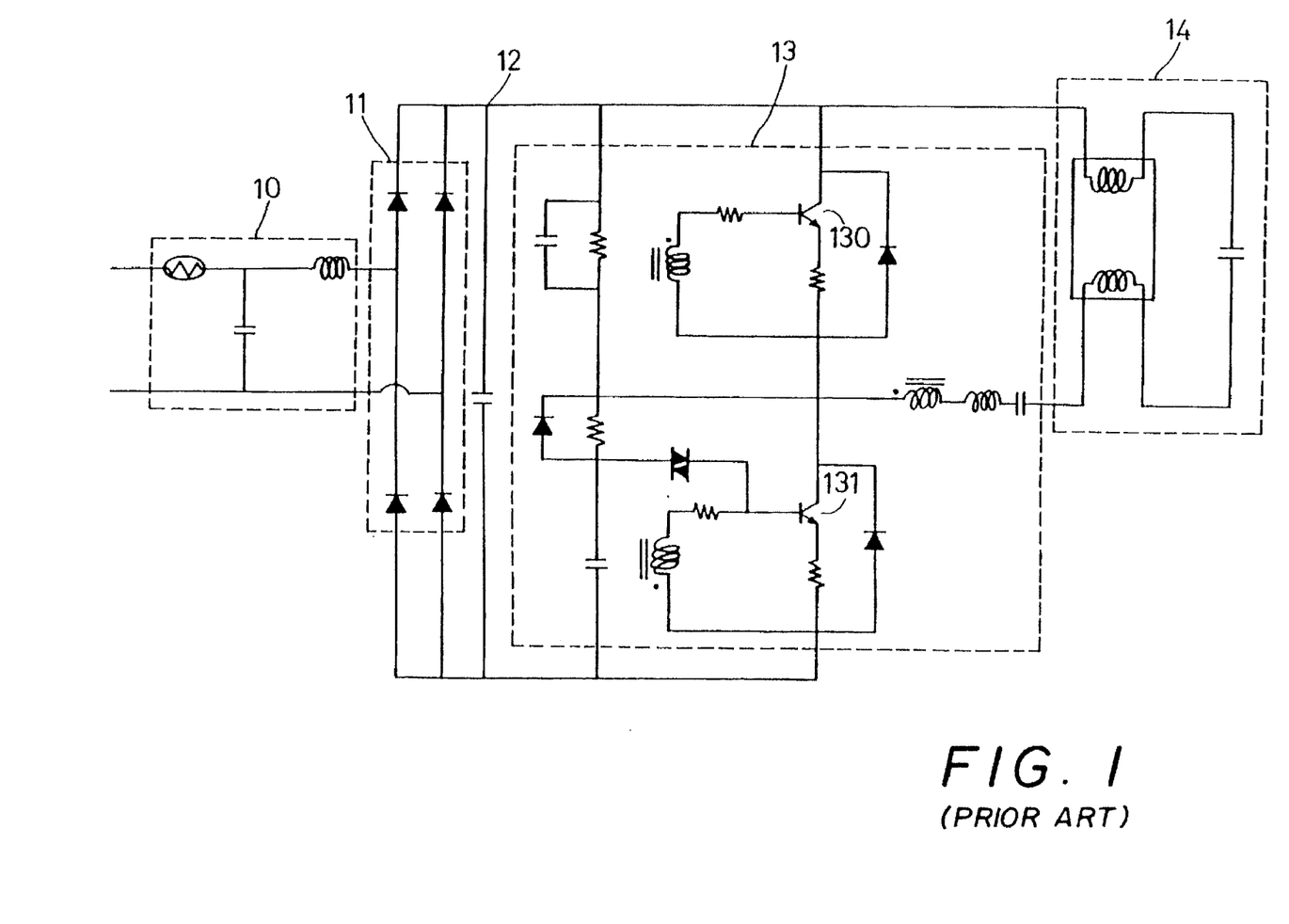
FIG. 1 is a circuit diagram of a known conventional electronic stabilizer.
Figure 2:
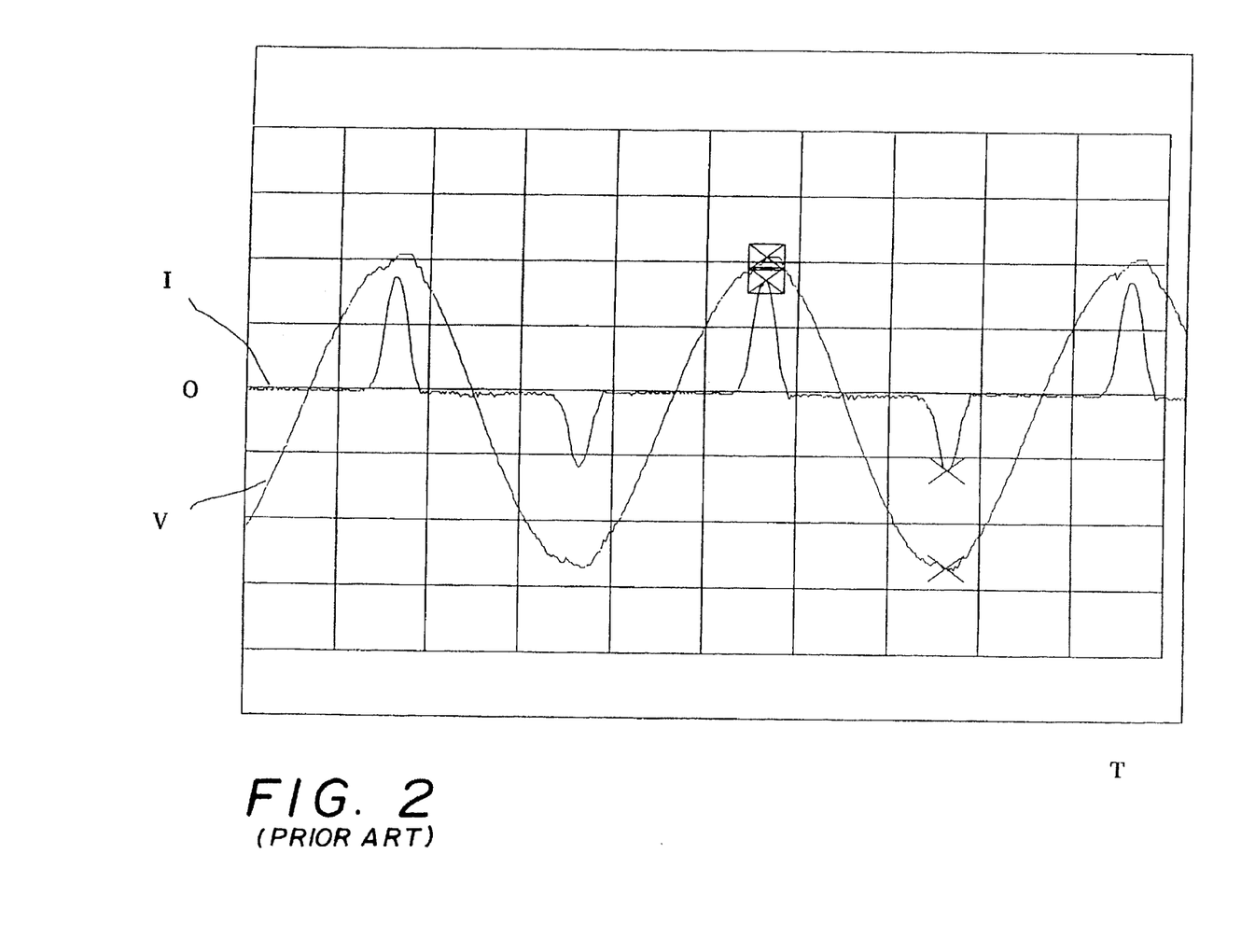
FIG. 2 is a graph of voltage and current of AC input of the known conventional electronic stabilizer.

A known conventional electronic stabilizer shown in FIG. 1 comprises a low frequency LC filter circuit 10, a bridge rectifier 11, and an electrolytic capacitor 12 for filtering wave, and a DC-AC altering circuit 13, and a driving lamp 14 electrically combined together. This stabilizer uses only the electrolytic capacitor 12 for charging and discharging and filtering low frequencies, so noise always appears in it, and additionally the current phase may advance farther than the voltage phase as shown in FIG. 2 so that its power factor may drop as low as 0.6, evidently wasting electricity. Besides, there in no protective device in the conventional stabilizer so that the circuit of the stabilizer and the lamp produce a large current in case of the lamp 14 malfunctions allowing transistors 130, 131 to be burned. Therefore, breakage of the lamp results in breakage of the stabilizer, which is not economical.

SUMMARY OF THE INVENTION

A main object of this invention is to improve delay of the phase of the current and the voltage of the AC input, and thus elevate the power factor so as to save electricity.

Another object of this invention is to lower the cost of a stabilizer having a high quality and no noise.

Another object of this invention is to offer a protective circuit additionally added to a stabilizer to prolong its service life and improve its quality.

One of the important features of the present invention is to utilize a lamp to receive a high frequency voltage and feed it back to the output of a rectifying circuit coupled with a high frequency filter connected before the rectifying circuit, switching the high frequency with the aid of the feed-back power improving circuit, and adjusting the phase difference for obtaining the best power factor.

Another important feature of the present invention is to connect a silicon-controlled rectifier and a coil between the base of a transistor of the oscillating circuit and the emitter of the same, and to utilize a feed-back coil and a diac connected in series with the gate of the silicon-controlled rectifier so that breakage of the lamp forces the feed-back coil to produce a high voltage to activate the diac to turn on the silicon-controlled rectifier so as to protect the stabilizer.

DETAILED DESCRIPTION OF THE INVENTION

Figure 3:
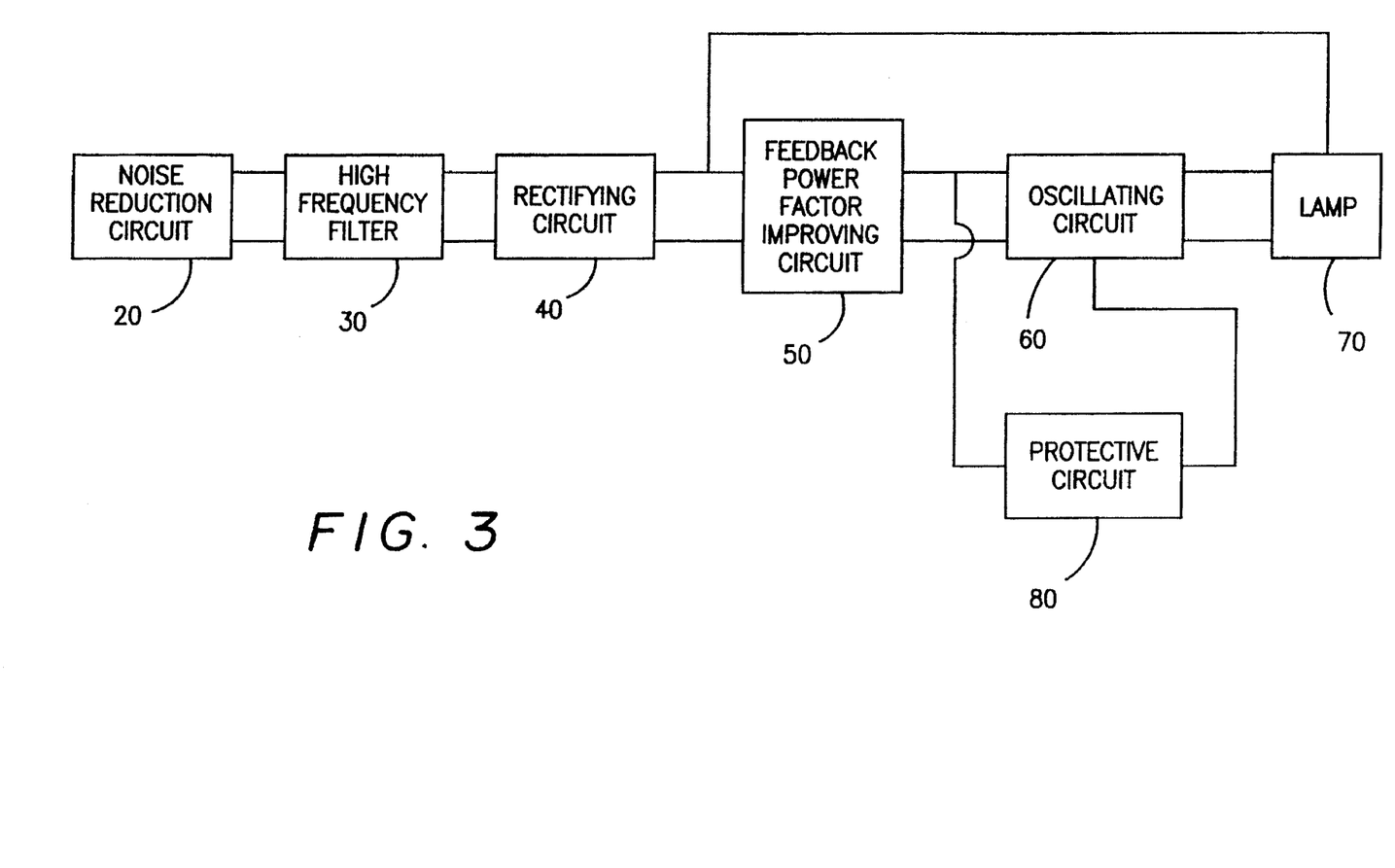
FIG. 3 is a block diagram of a preferred embodiment of a high power factor electronic stabilizer having a protection circuit according to the present invention.
Figure 4:
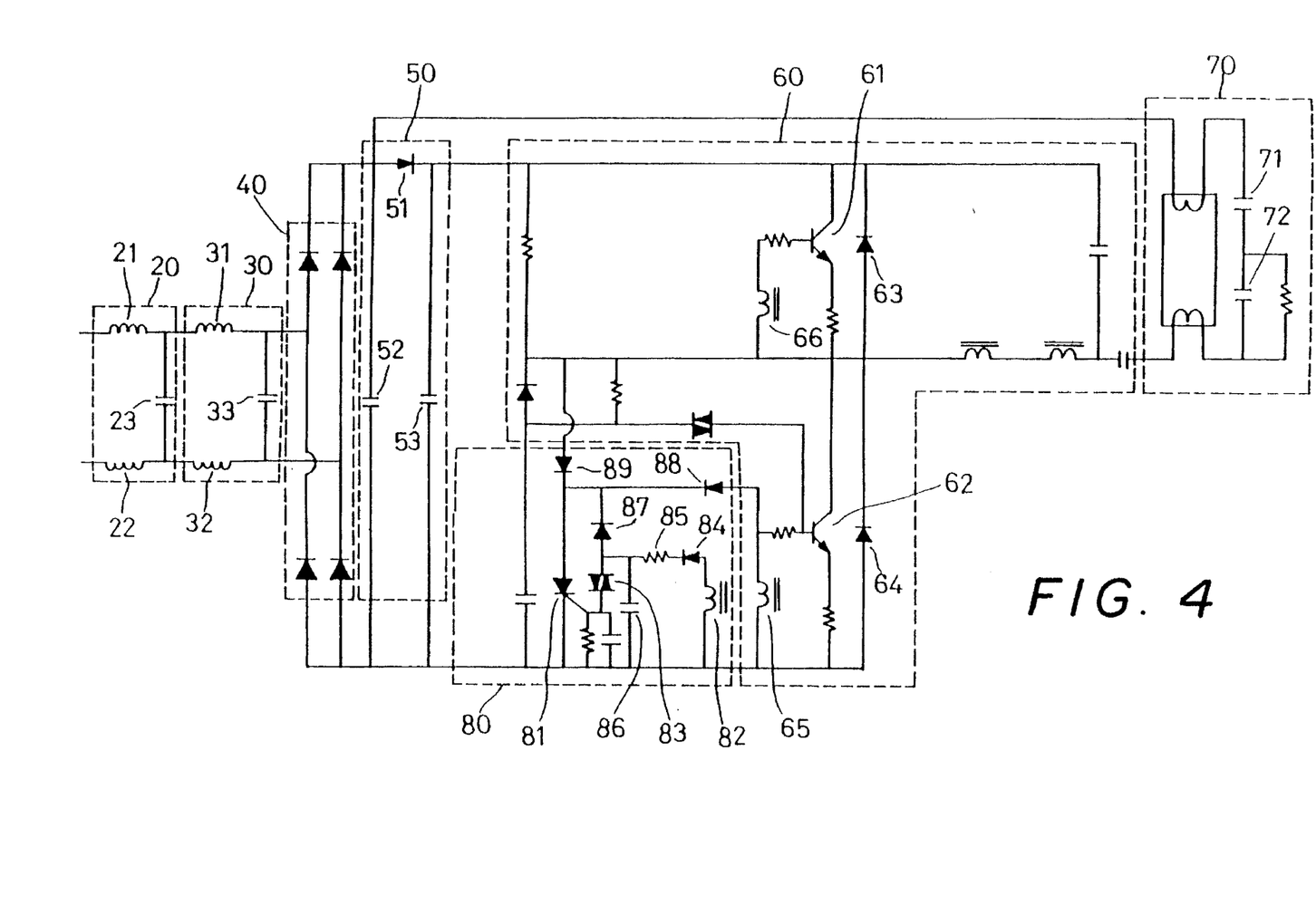
FIG. 4 is a circuit diagram of the preferred high power factor electronic stabilizer with protection circuit.

A high power factor electronic stabilizer with protection circuit application in the present invention, as shown in FIG. 3 and 4, comprises a noise reduction circuit 20 consisting of two inductors 21, 22 and a capacitor 23 for reducing noise but which may be omitted with affecting the function of this invention, a high frequency filter 30 consisting of inductors 31, 32 using small transformers with an iron powder core and a capacitor 33 for filtering high frequencies and adjusting the phase difference of current and voltage, a rectifying circuit 40 connected with the high frequency filter 30 and which may consist of a bridge rectifier, a full wave rectifier or a half wave rectifier although in this embodiment a bridge rectifier is used, a circuit for converting an input from an AC power source into a DC output for a lamp 70 and a feed-back power factor improving circuit 50, which includes a diode 51, circuit 50 forming a minus half cycle circuit, with the anode of the diode 51 connected with the lamp 70. The feed-back power factor improving circuit 50 also has a capacitor 53, two terminals of which are connected in parallel with an oscillating circuit 60. The oscillating circuit 60 includes two transistors 61, 62 and two free wheeling diodes 63, 64, producing an oscillating high frequency for the lamp 70 to feed back to the output of the rectifying circuit 40, with the base and the emitter of the transistors 61, 62 connected respectively with coils 65, 66. A protective circuit 80 is provided between the oscillating circuit 60 and the feed-back power factor improving circuit 50, mainly between the base and the emitter of the transistor 62, and consists of a silicon-controlled rectifier 81, a feed-back coil 82, a diac 83 connected in series with the gate of the silicon-controlled rectifier 81, a resistor 85, a capacitor 86 and diodes 87, 88 and 89.

Figure 5:
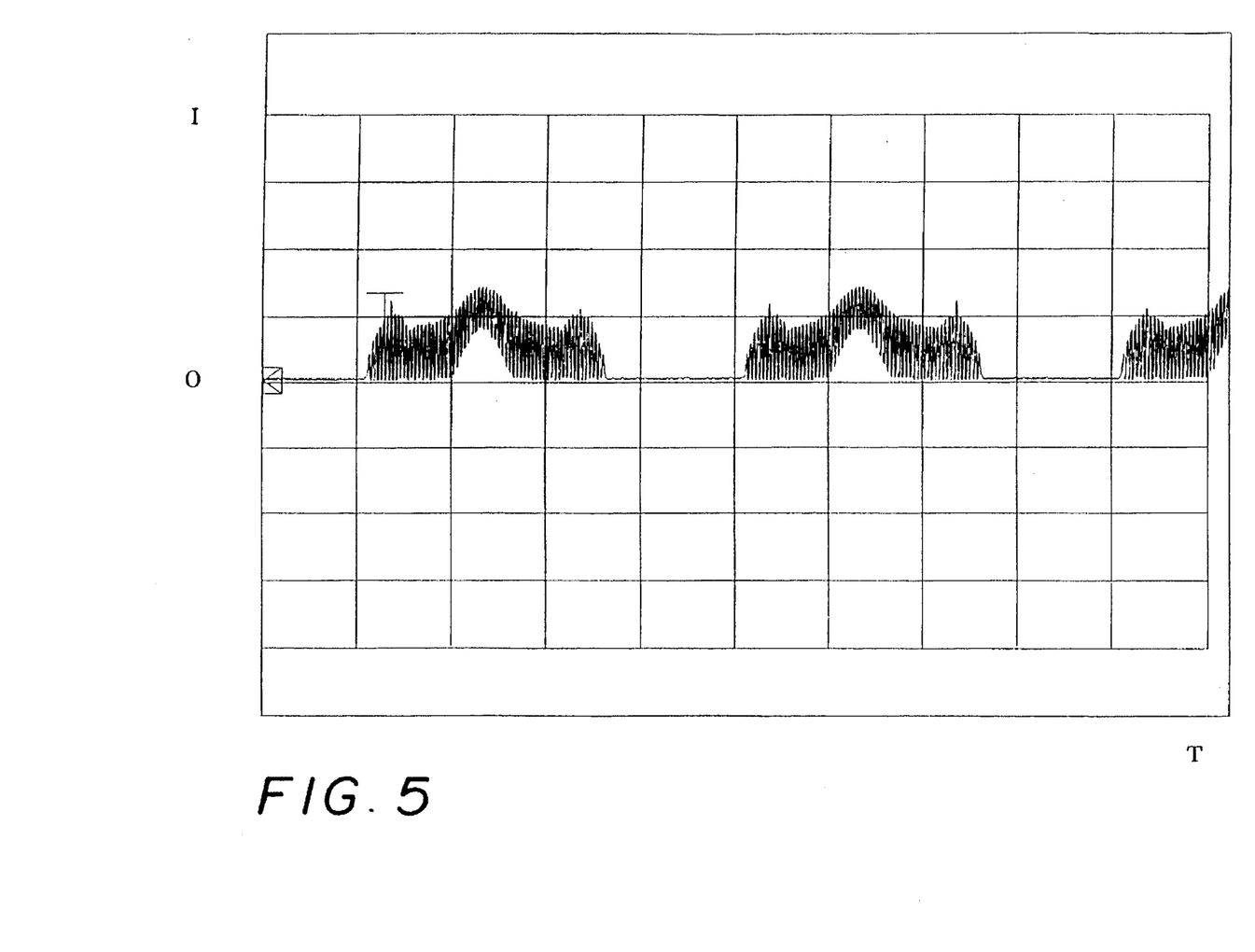
FIG. 5 is a graph of the current at the output of a rectifying circuit in the preferred high power factor electronic stabilizer with protection circuit.
Figure 6:
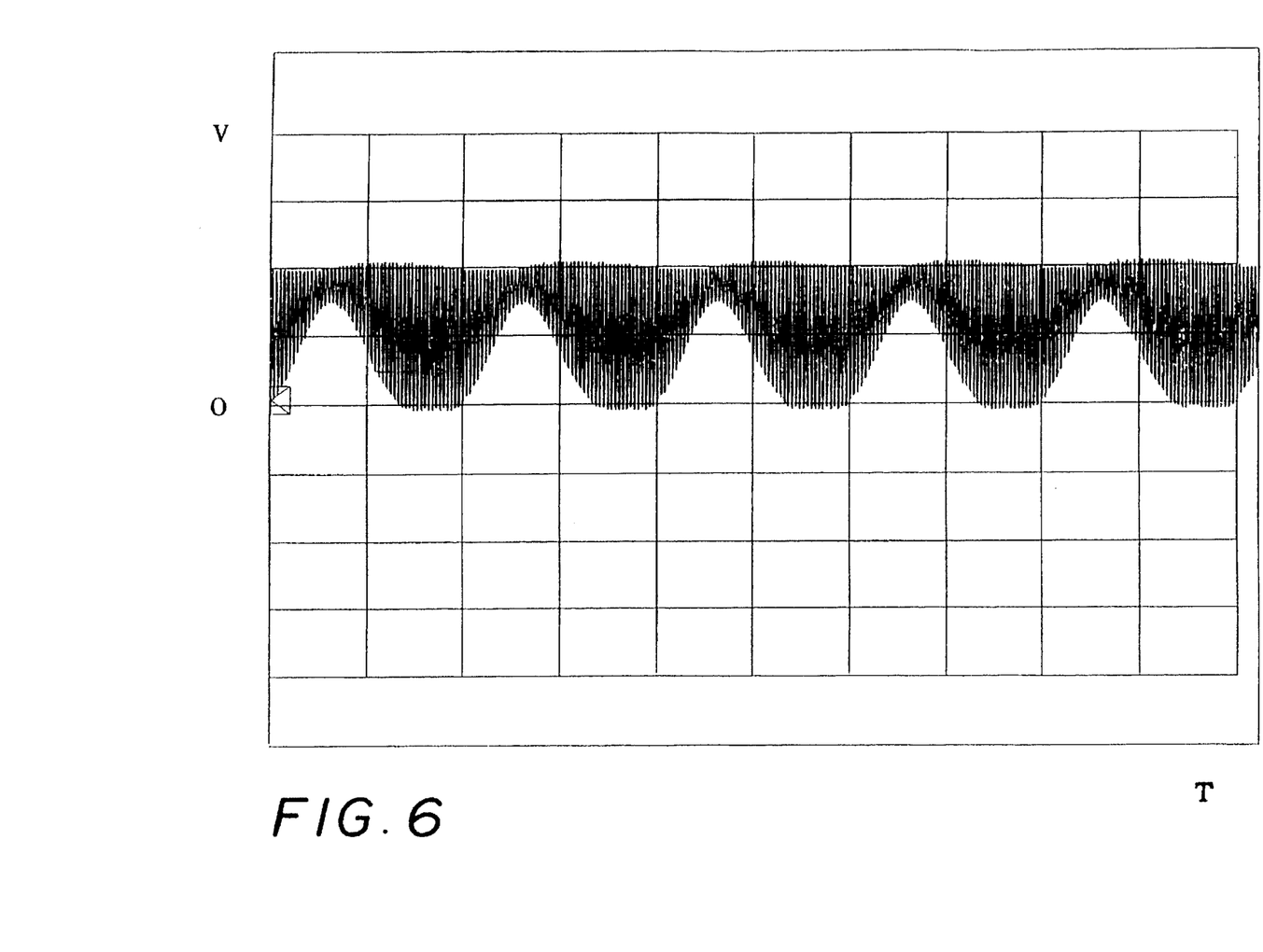
FIG. 6 is a graph of the voltage waveform across a diode connected between the rectifying circuit and an electrolytic capacitor in the preferred high power factor electronic stabilizer with protection circuit.
Figure 7:
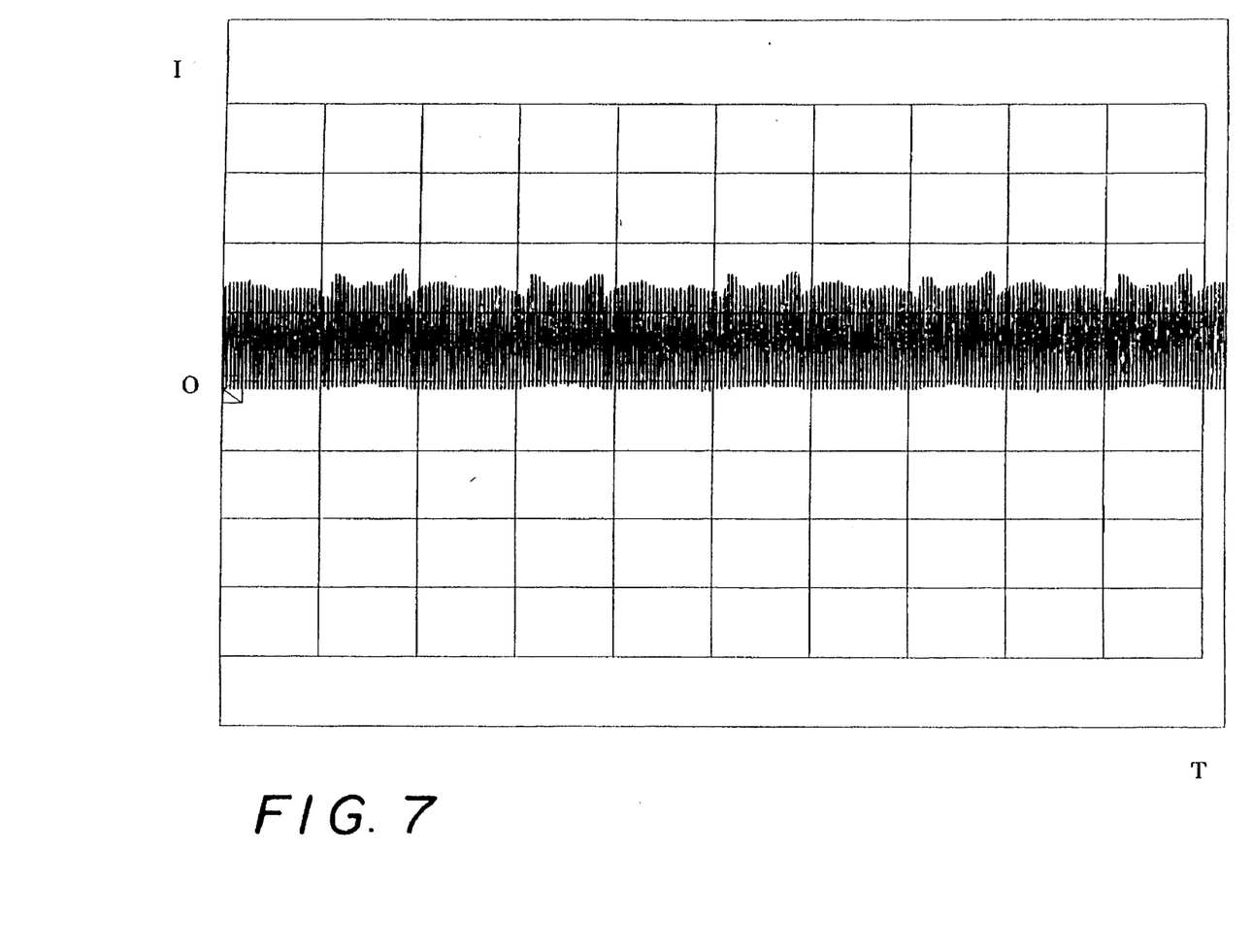
FIG. 7 is a graph of the current waveform across the diode connected between the rectifying circuit and an electrolytic capacitor in the preferred high power factor electronic stabilizer with protection circuit.
Figure 8:
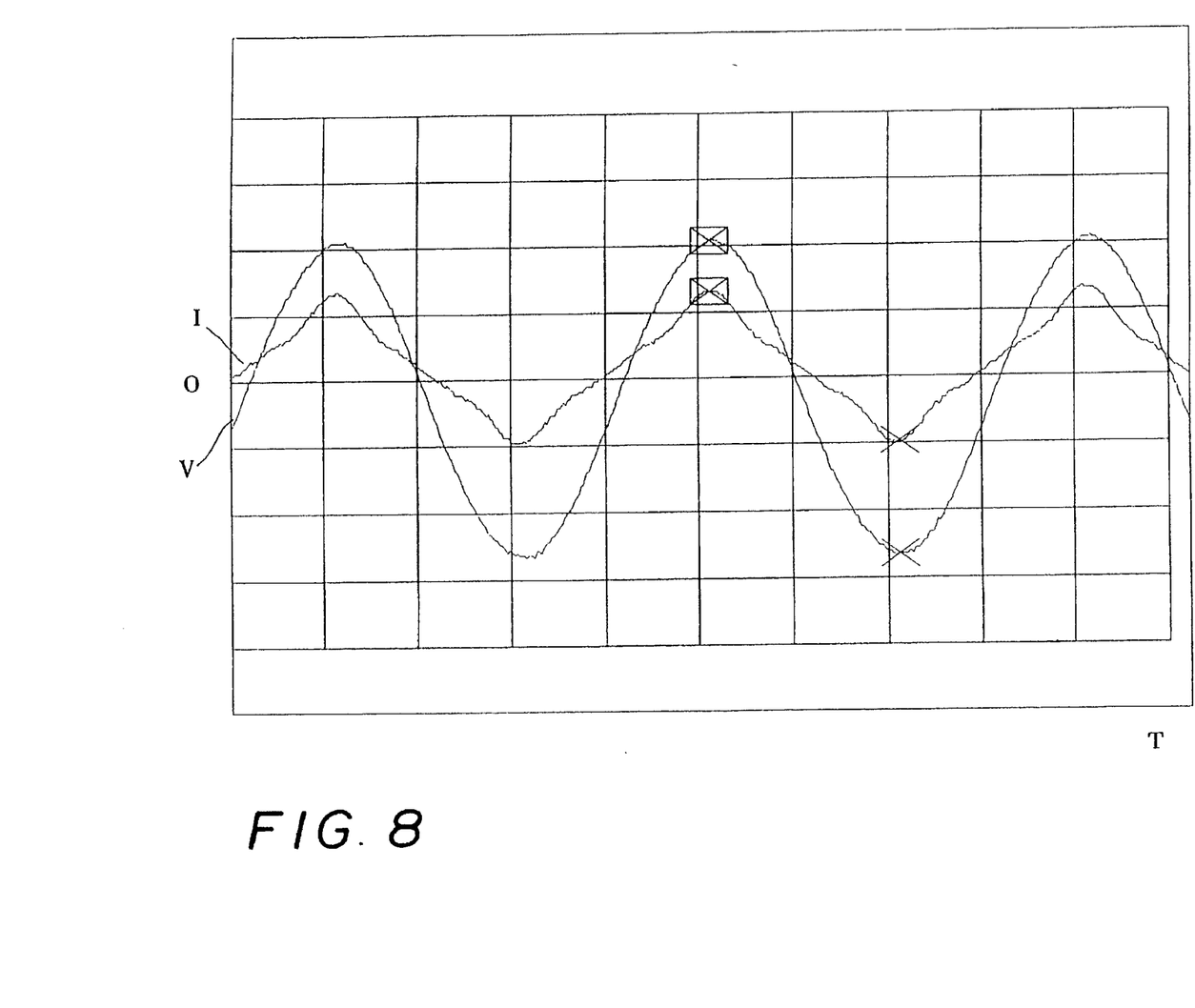
FIG. 8 is a graph of current and voltage at the AC input of the preferred high power factor electronic stabilizer with protection circuit.

The principle of power factor improving in the present invention is described as follows. As the oscillating circuit 60 supplies a high frequency voltage to the lamp 70, which feeds back the voltage to the output of the rectifier circuit 40, i.e. the left terminal of the diode 51, the diode 51 turns on wherever the voltage at the left terminal of the diode 51 is larger than that at the right terminal. But if the voltage at the left terminal of the diode 51 is smaller than that at the right terminal, the diode 51 turns off, and then the energy needed by the lamp 70 and the load is supplied by the electrolytic capacitor 53. Because the power source does not need to supply energy to the electrolytic capacitor 53, in order to effect adjustment of the phase angle electricity results with the electrolytic capacitor 53 forming a discharging circuit for the lamp 70. When the voltage at the left terminal of the diode 51 grows larger than that at the right terminal owing to discharge of the electrolytic capacitor 53, the diode 51 turns on, with the input of the power source beginning to charge the electrolytic capacitor 53, supplying sufficient energy to the load. The frequency of repeated charge and discharge depends on the operating frequency of the lamp 70, so the voltage of high frequency fed back by the lamp 70 causes the low frequency wave at the output of the rectifying circuit 40 to have a high frequency, as shown in FIGS. 5, 6 and 7. The feed-back power factor improving circuit 50 thus switches high frequencies, with the switched frequency being the same as that of the oscillating frequency of the line. The high frequency filter 30 at the front stage filters high frequency and adjusting the phase angle, as shown in FIG. 5, letting the input voltage and the input current have a minimum phase difference, as shown in FIG. 8. Practical test of the circuit shows that the power factor is raised as high as more than 0.98.

Next, the principle of the protective circuit 80 is described. If the lamp 70 gets out of order, the feed-back coil 82 induces a comparatively high voltage, and a current flows through the diode 84 and the resistance 85 to charge the capacitor 86.

Figure 9:
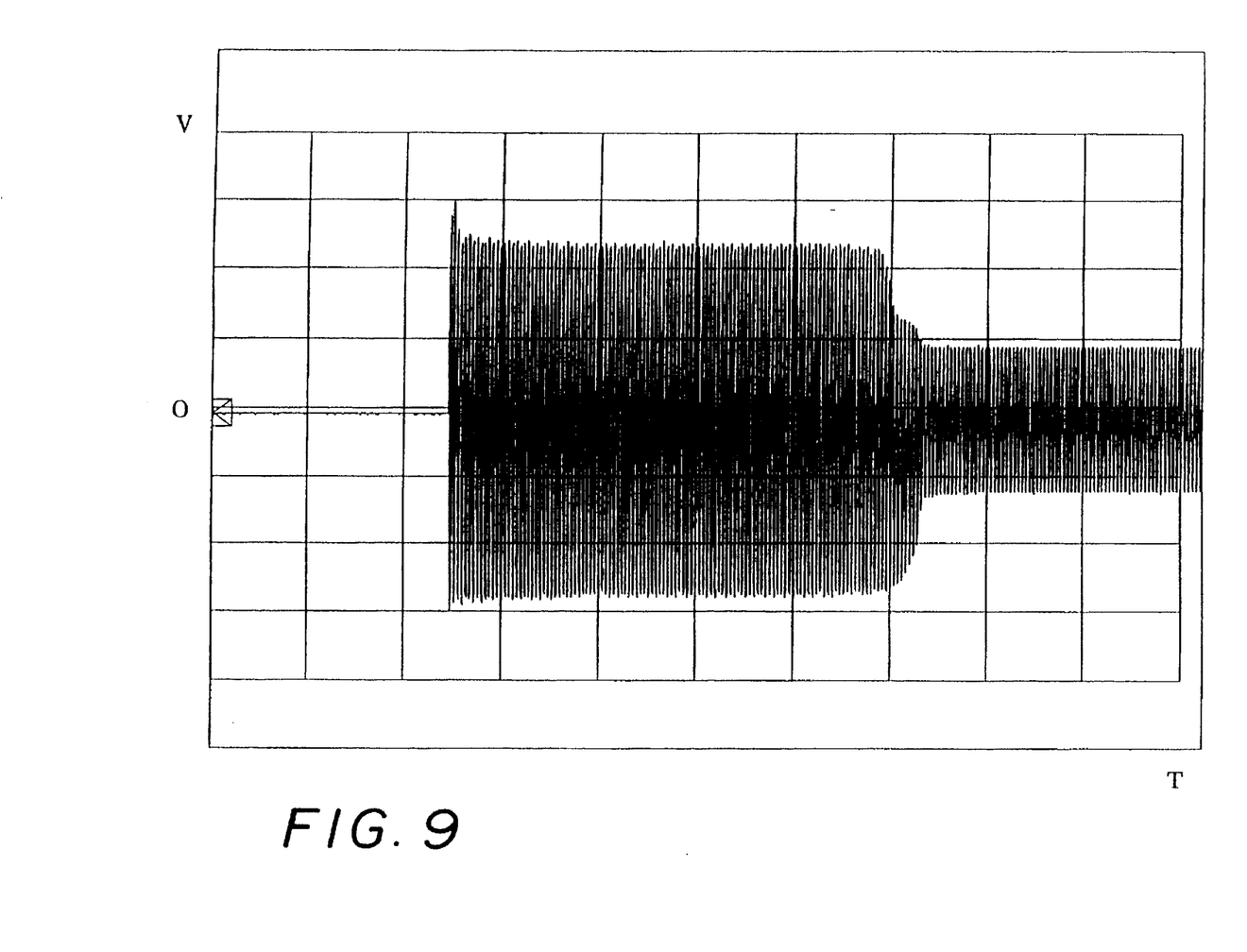
FIG. 9 is a graph of the voltage across a feed-back coil during lighting of a lamp and after lighting of the lamp in the preferred high power factor electronic stabilizer with protection circuit.
Figure 10:
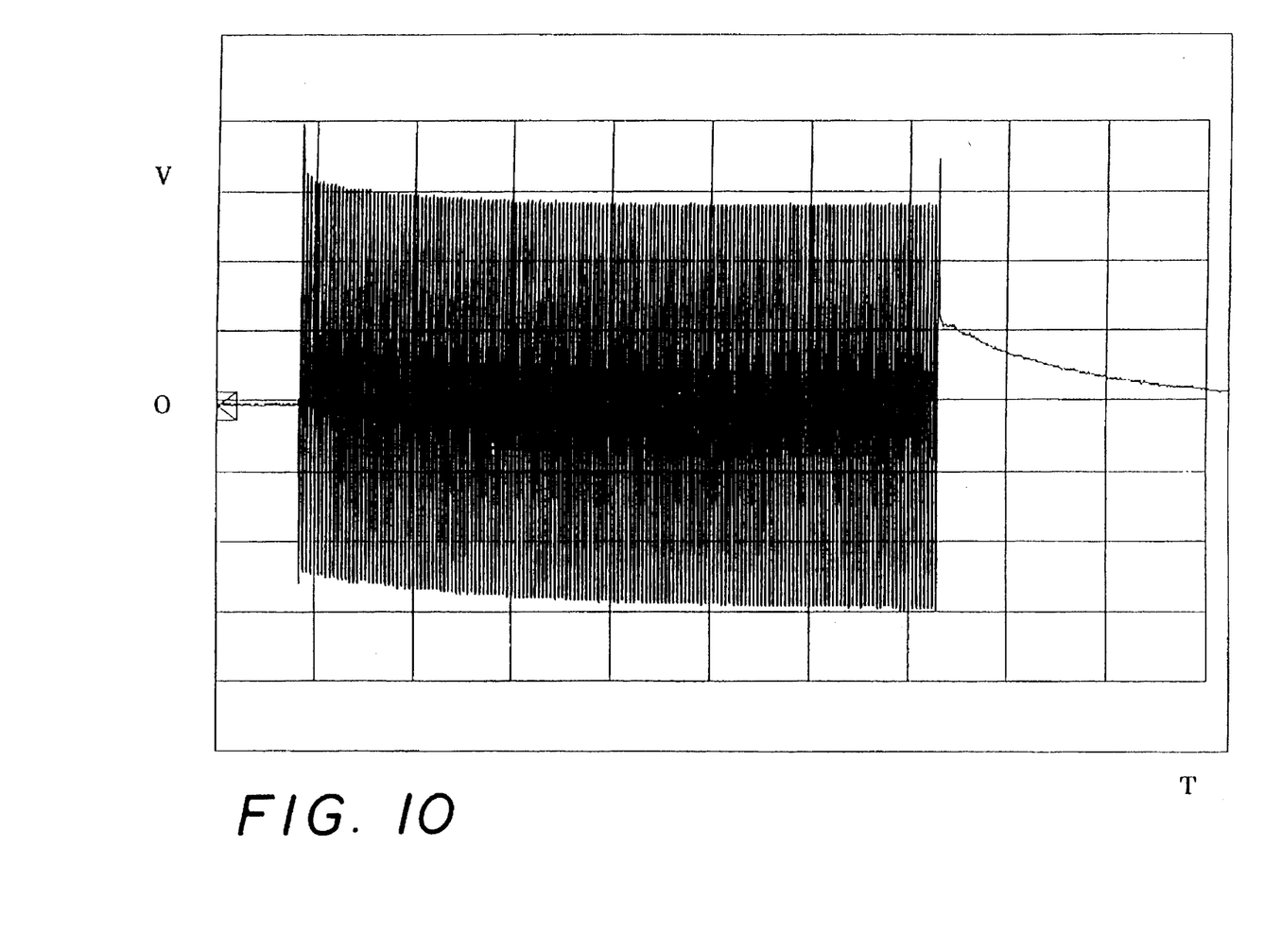
FIG. 10 is a graph of voltage in the feed-back coil in case of the lamp getting out of order and after a protective circuit turns on in the preferred high power factor electronic stabilizer with protection circuit.

When the voltage of the capacitor 86 becomes larger than the breaking-down voltage of the diac 83, the diac 83 turns on, activating the gate of the silicon-controlled rectifier 81 and letting the rectifier operate normally in through condition. Then the diodes 87, 88, and 89 are in short-circuited condition, and at the same time the capacitor 86 discharges via the diode 87 and the silicon-controlled rectifier 81, with its voltage being 0. The coil 65 is short-circuited via the diode 88, so the activating signal of the base of the transistor 62 equals 0. The line voltage of the anode of the diode 89 is short-circuited via the diode 89 and the silicon-controlled rectifier 81, becoming 0 and securing cut-off of the transistors, thereby and keeping the stabilizer in protected condition, as shown in FIGS. 9 and 10. But if the broken lamp 70 is displaced for a new one, it will activate the power source, with the gate of the silicon-controlled rectifier 81 not receiving high voltage, so the silicon-controlled rectifier 81 is kept in an off condition, enabling the transistors 61, 62 maintain normal switching operation.

Figure 11:
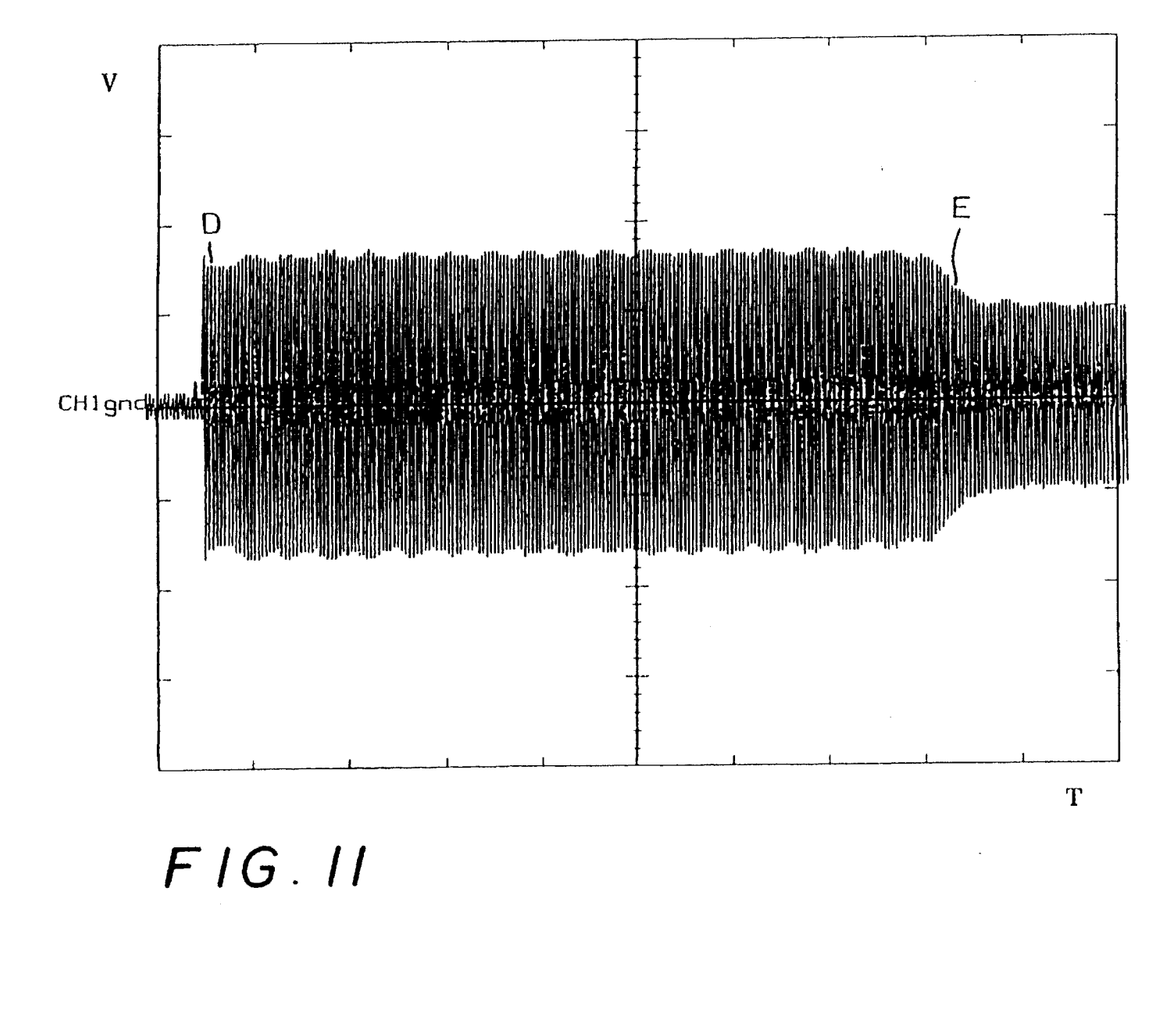
FIG. 11 is a graph of voltage change of the feed-back coil 82 during normal operation in the preferred high power factor electronic stabilizer with protection circuit.

FIG. 11 shows the changing condition of voltage rage on the feed-back coil 82 in normal operation. When the lamp 70 is not yet lit up at start of the power source, current flows through the capacitors 71, 72, with the current and the voltage of the feed-back coil 82 being comparatively large between the point D and E in FIG. 11. For fear of wrong operation of the silicon-controlled rectifier 81 by activation of the lamp 70 because of this high voltage for a short period, a resistance 85 is especially provided between the gate of the silicon-controlled rectifier 81 and the feed-back coil 82 for adjusting the RC time constant with the capacitor 86, preventing the wrong operation of the silicon-controlled rectifier 81 and securing accurate operation of this embodiment of the invention.

The present invention may be deemed to have the following advantages from the above description.

1. It improves the phase delay of the AC input voltage and current to increase power factor and thus save electricity.

2. It uses high frequency instead of low frequency for reducing the dimensions of the components and noise.

3. It uses the cheapest components to form the simplest useful circuit for reducing the cost.

4. It has a protective device of special design for improving its quality and prolonging its service life.

What is claimed is:

1. A high power factor electronic stabilizer, comprising:

a lamp powered by a high frequency lamp voltage;

an oscillating circuit connected to the lamp;

a power input;

a rectifying circuit;

a high frequency filter consisting of induction coils and capacitors connected between the power source input and the rectifying circuit, a feedback power factor improving circuit including a diode connected in series between the rectifying circuit and the oscillating circuit and an electrolytic capacitor connected in parallel between the rectifying circuit and the oscillating circuit; and means connected between the lamp and the anode of the feedback power factor improving circuit diode for applying the high frequency lamp voltage directly to an output of the rectifying circuit, wherein said electrolytic capacitor thereby forms a means for phase shifting the output of the rectifying circuit to which the high frequency lamp voltage has been directly applied and thereby adjust the phase of the oscillating circuit input voltage to match that of the oscillating current supplied to the lamp in order to maximize a power factor of power supplied to the lamp by the oscillating circuit.

2. A stabilizer as claimed in claim 1, further comprising a protection circuit connected between the oscillating circuit and the feedback power improving circuit and consisting of a silicon-controlled rectifier connected to the base of a transistor in said oscillating circuit, with the emitter of said transistor forming a circuit with a diac and a feedback coil, wherein the feedback coil of the oscillating circuit induces a high voltage and activates said diac to keep turning on said silicon-controlled rectifier when the lamp malfunctions.

3. A stabilizer as claimed in claim 2, wherein an anode of said silicon-controlled rectifier is connected by means of diodes to said base of said transistor and to a base of a second transistor in said oscillating circuit to shut off the transistors as long as the feedback induces a high voltage indicative of a lamp malfunction.

4. A stabilizer as claimed in claim 2, wherein a resistance is connected in series and a capacitor is connected in parallel between a gate of the silicon-controlled rectifier and the feedback coil for controlling a time constant of the silicon-controlled rectifier to prevent shut off from occurring as a result of short duration voltage fluctuations.

5. A stabilizer as claimed in claim 1, wherein the induction coils are part of a high frequency transformer with a high frequency iron powder core.

6. A stabilizer as claimed in claim 1, further comprising a capacitor connected to an anode of said diode and in parallel between said rectifying circuit and said oscillating circuit.

* * * * *